United States Patent
Ishii et al.

(10) Patent No.: US 10,692,210 B2
(45) Date of Patent: Jun. 23, 2020

(54) RECORDING MEDIUM STORING COMPUTER PROGRAM FOR PUPIL DETECTION, INFORMATION PROCESSING APPARATUS, AND PUPIL DETECTING METHOD

(71) Applicant: FUJITSU LIMITED, Kawasaki-shi, Kanagawa (JP)

(72) Inventors: Daisuke Ishii, Kawasaki (JP); Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 15/989,265

(22) Filed: May 25, 2018

(65) Prior Publication Data

US 2018/0350070 A1   Dec. 6, 2018

(30) Foreign Application Priority Data

May 31, 2017   (JP) .................................. 2017-107980

(51) Int. Cl.
| | | |
|---|---|---|
| G06T 1/00 | (2006.01) | |
| G06T 7/00 | (2017.01) | |
| G06T 7/62 | (2017.01) | |
| G06F 3/01 | (2006.01) | |
| G06T 7/70 | (2017.01) | |

(Continued)

(52) U.S. Cl.
CPC ............ *G06T 7/0012* (2013.01); *G06F 3/013* (2013.01); *G06K 9/00604* (2013.01); *G06K 9/4604* (2013.01); *G06K 9/4652* (2013.01); *G06T 7/62* (2017.01); *G06T 7/70* (2017.01); *G06T 7/73* (2017.01); *G06T 2207/30041* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,347,547 B2 * | 3/2008 | Sugita | ................ | G06K 9/00597 351/205 |
| 7,444,017 B2 * | 10/2008 | Gallagher | ............ | G06K 9/0061 382/117 |

(Continued)

FOREIGN PATENT DOCUMENTS

| | | |
|---|---|---|
| JP | 2003-144388 A | 5/2003 |
| JP | 2009-059165 A | 3/2009 |

(Continued)

*Primary Examiner* — Cindy Trandai
(74) *Attorney, Agent, or Firm* — Fujitsu Patent Center

(57) ABSTRACT

A recording medium storing a program causing a computer to execute: detecting an eye area of the eye; detecting bright spot areas in the eye area; setting a reference point in a pupil; setting a first search lines radially; determining whether each first search lines passes through the bright spot areas; determining, for a second search line that passes through the bright spot area, a degree of overlapping between the bright spot area and the pupil based on brightness on a circumference of the bright spot area; setting a search range for a point on a contour of the pupil based on the degree; detecting a first point on the contour; detecting, for a third search line that does not pass through the bright spot areas, a second point on the contour on the third search line; and detecting the pupil, based on the first and second points.

18 Claims, 10 Drawing Sheets

(51) Int. Cl.
  *G06T 7/73* (2017.01)
  *G06K 9/46* (2006.01)
  *G06K 9/00* (2006.01)

(56) References Cited

U.S. PATENT DOCUMENTS

| | | | | |
|---|---|---|---|---|
| 8,750,623 B2 * | 6/2014 | Ruan | ............ | G06T 7/12 |
| | | | | 382/103 |
| 9,355,315 B2 * | 5/2016 | Vugdelija | ............ | G06K 9/6218 |
| 10,417,494 B2 * | 9/2019 | Ishii | ............ | G06F 3/013 |
| 2004/0190759 A1 * | 9/2004 | Caldwell | ............ | G06K 9/00597 |
| | | | | 382/117 |
| 2004/0196433 A1 * | 10/2004 | Durnell | ............ | G06K 9/00604 |
| | | | | 351/209 |
| 2006/0280362 A1 * | 12/2006 | Umeda | ............ | G06K 9/0061 |
| | | | | 382/167 |
| 2006/0291702 A1 * | 12/2006 | Miessbacher | ...... | G06K 9/00604 |
| | | | | 382/117 |
| 2011/0280454 A1 * | 11/2011 | Su | ............ | G06K 9/0061 |
| | | | | 382/117 |
| 2012/0177266 A1 * | 7/2012 | Tsukizawa | ............ | A61B 3/113 |
| | | | | 382/128 |
| 2015/0262342 A1 * | 9/2015 | Matsunaga | ............ | G06K 9/00268 |
| | | | | 382/195 |
| 2016/0379093 A1 * | 12/2016 | Yoshioka | ............ | G06K 9/00255 |
| | | | | 382/159 |
| 2018/0089834 A1 * | 3/2018 | Spizhevoy | ............ | G06K 9/0061 |
| 2018/0137384 A1 * | 5/2018 | Kim | ............ | G06K 9/0061 |
| 2018/0285620 A1 * | 10/2018 | Wagner | ............ | G06K 9/00597 |
| 2018/0365844 A1 * | 12/2018 | Cai | ............ | G06T 7/248 |

FOREIGN PATENT DOCUMENTS

| | | |
|---|---|---|
| JP | 2009-254525 A | 11/2009 |
| JP | 2012-24154 A | 2/2012 |
| JP | 2017-10337 A | 1/2017 |

* cited by examiner

FIG. 8

| LINE-OF-SIGHT DIRECTION (h°,v°) | (0,0) | (0,1) | ... | (2,0) | ... |
|---|---|---|---|---|---|
| GAZE POSITION | (cx,cy) | (cx,cy+40) | ... | (cx+40,cy) | ... |

801

800

RECORDING MEDIUM STORING COMPUTER PROGRAM FOR PUPIL DETECTION, INFORMATION PROCESSING APPARATUS, AND PUPIL DETECTING METHOD

CROSS-REFERENCE TO RELATED APPLICATION

This application is based upon and claims the benefit of priority of the prior Japanese Patent Application No. 2017-107980, filed on May 31, 2017, the entire contents of which are incorporated herein by reference.

FIELD

The embodiment discussed herein is related to a recording medium storing therein a computer program for pupil detection, an information processing apparatus, and a pupil detecting method.

BACKGROUND

A study is being conducted on detecting the line-of-sight direction of a person to obtain information regarding what the person is interested in or to automatically execute an operation related to the line-of-sight direction or a position at which the person is gazing. Hereinafter, a position at which a person is gazing is simply referred to as a "gaze position", for the sake of convenience.

Related technologies are disclosed in Japanese Laid-open Patent Publication No. 2003-144388 and Japanese Laid-open Patent Publication No. 2012-24154.

SUMMARY

According to an aspect of the embodiments, a non-transitory computer-readable recording medium storing a computer program for pupil detection which causes a computer to execute a process, the process includes: detecting, from an image of an eye of a user, an eye area in which the eye is captured; detecting one or more bright spot areas in the eye area; setting a reference point that is assumed to be located in a pupil in the eye area; setting a plurality of first search lines radially from the reference point; determining whether or not each of the first search lines passes through the one or more bright spot areas; determining, with respect to a second search line that is included in the plurality of first search lines and that passes through one of the one or more bright spot areas, a degree of overlapping between the one of the bright spot areas and the pupil in accordance with brightness on a circumference of the one of the bright spot areas; setting a search range for a point on a contour of the pupil in accordance with the degree of overlapping; detecting, in the search range, a first point on the contour of the pupil; detecting, with respect to a third search line that is included in, the plurality of first search lines and that does not pass through the one or more bright spot areas, a second point on the contour of the pupil on the third search line; and detecting the pupil, based on the first point and the second point.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example of a gaze-position table;

DESCRIPTION OF EMBODIMENT

Figure 1:
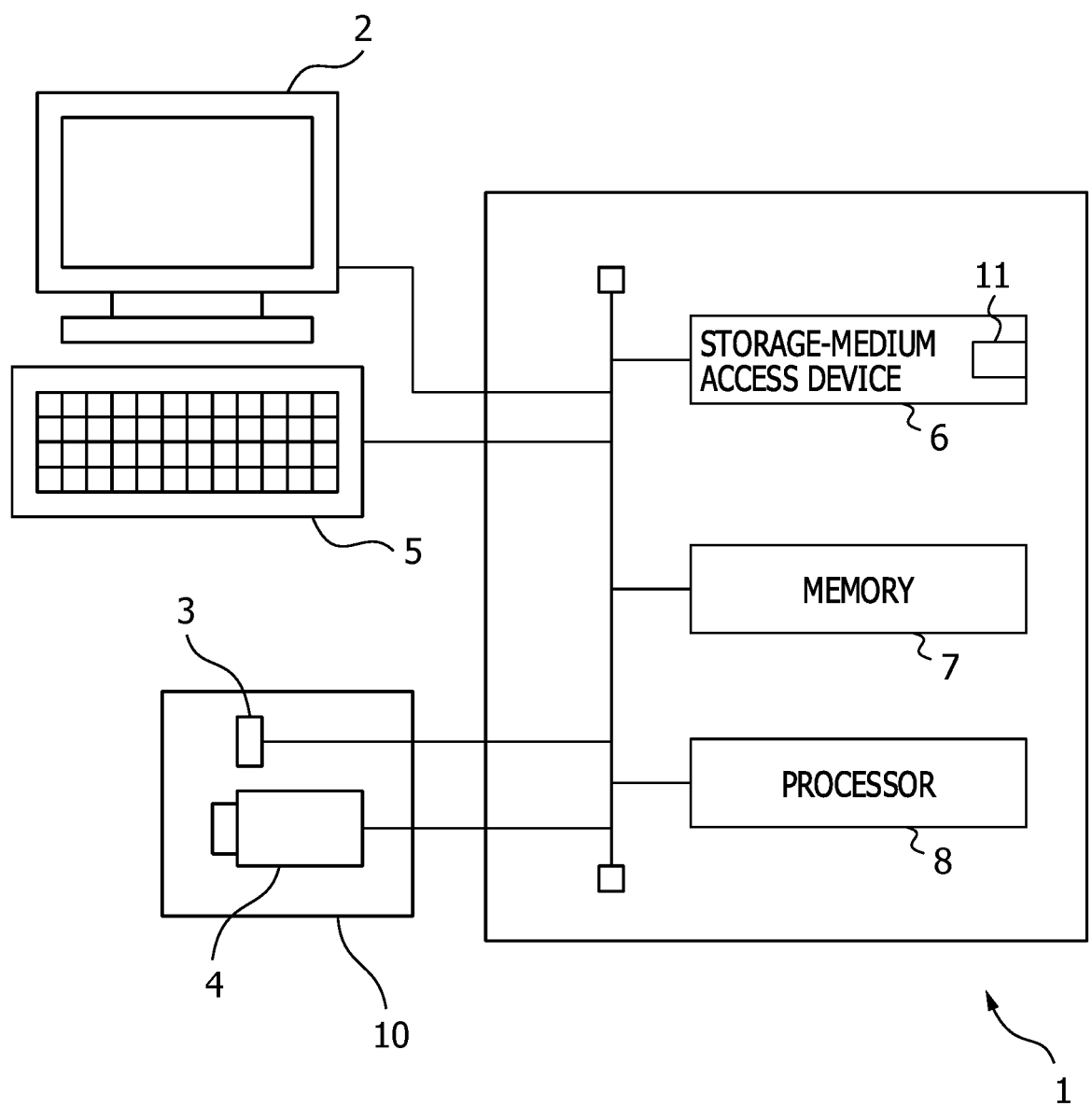
FIG. 1 illustrates an example of a hardware configuration of a digital signage system.

For example, the line-of-sight direction of a person is detected to thereby obtain information regarding what the person is interested in or to thereby automatically execute an operation related to the line-of-sight direction or a position at which the person is gazing. Hereinafter, a position at which a person is gazing is referred to as a "gaze position", for the sake of convenience.

The gaze position or the line-of-sight direction of a person is closely related to the direction of his or her pupils. For example, a pupil is detected from an image acquired by photographing the eye of a person, and the line-of-sight direction or the gaze position of the person is identified based on the positional relationship between the pupil and a reference point. For example, a cornea reflection image (hereinafter referred to as a "Purkinje image") of a light source is used as a reference point.

A pupil shown in an image may be accurately detected in order to detect the line-of-sight direction based on the positional relationship between the pupil and the reference point.

For example, when a pupil image and a Purkinje image overlap each other in an image, there are cases in which part of the contour of the pupil does not appear in the image. Accordingly, for example, a plurality of line segments having its one end at a reference point in a Purkinje image and having a predetermined length is set, and a brightness evaluation value is calculated based on brightnesses of pixels on the line segments and a reference brightness. A pupil-center straight line that passes through the center of a pupil image is located in the plurality of line segments, based on the calculated brightness evaluation value, and the pupil image is detected based on a brightness state in the vicinity of the pupil-center straight line.

For example, what can overlap a pupil image in an image is not only a Purkinje image. For example, when a person wears eyeglasses, a light source image reflected by the eyeglasses may overlap the pupil image. Also, a plurality of light source images may be captured in the image. In such cases, the pupil may not be accurately detected.

For example, a pupil detecting method may be provided that detects the pupil with high accuracy even when a plurality of bright spots that overlaps the pupil exists in an image.

This, pupil detecting device uses a camera to photograph at least one of the eyes of a user illuminated with a tight source to thereby generate an image and detects the pupil of the user in the image to thereby detect the line-of-sight direction of the user. To this end, the pupil detecting device sets a reference point that is assumed to exist in the pupil shown in the image and sets a plurality of search lines radially from the reference point. The pupil detecting device detects, for each search line, a point of the contour of the pupil (the point is hereinafter referred to as a "contour point"), based on brightness changes along the search line. For the detection, with respect to an area (hereinafter referred to as a "bright spot area") showing a bright spot (for example, a Purkinje image) in the image which overlaps any of the search lines, the pupil detecting device estimates a degree of overlapping between the bright spot area and the pupil in accordance with brightness of the circumference of the bright spot area. In accordance with the estimated degree of overlapping, the pupil detecting device sets a search range for searching for a contour point with respect to the search line that overlaps the bright spot area. Thus, even when a plurality of bright spot areas is included in an eye area, the pupil detecting device can accurately detect contour points of the pupil to thereby accurately detect the pupil in the image.

For example, the pupil detecting device is implemented in a digital signage system, and the pupil detecting device detects the gaze position of a user of the digital signage system.

FIG. 1 illustrates an example of a hardware configuration of a digital signage system. A digital signage system 1 illustrated in FIG. 1 may be a pupil detecting device. The digital signage system 1 includes a display device 2, an illumination light source 3, an infrared camera 4, an input device 5, a storage-medium access device 6, a memory 7, and a processor 8. The digital signage system 1 may further include a communication interface circuit for connecting the digital signage system 1 to another appliance.

The display device 2 includes, for example, a liquid-crystal display or an organic electroluminescent display. The display device 2 displays, for example, various texts, icons, still images or moving images in accordance with a control signal from the processor 8.

The illumination light source 3 has a light source, for example, at least one infrared emitting diode, for emitting infrared light and a drive circuit (not illustrated) for supplying electric power from a power source (not illustrated) to the infrared emitting diode(s) in accordance with a control signal from the processor 8. In order to enable illumination in a photography direction of the infrared camera 4, the illumination light source 3 is attached to a housing 10, which is the same housing of the infrared camera 4, so that a light emitting face of the illumination light source 3 is directed to the photography direction of the infrared camera 4. The illumination light source 3 emits illumination light, while receiving, from the processor 8, a control signal for turning on the light source.

The infrared camera 4 is one example of an image capture unit and generates an image in which at least a part of a user's face, the part including at least one of the left and right eyes, is captured. To this end, the infrared camera 4 has an image sensor and an image-capture optical system. The image sensor has solid-state image capture elements arranged two-dimensionally and having sensitivity to infrared light emitted by the illumination light source 3, and the image-capture optical system forms an image of a subject on the image sensor. The infrared camera 4 may further have a visible light cutting filter between the image sensor and the image-capture optical system in order to suppress detection of a reflection image due to the iris and a Purkinje image of light from a light source other than the illumination light source 3. The image-capture optical system may also be a single-focus optical system or a variable-focus optical system. While pupil detection processing is executed, the infrared camera 4 generates an image by photographing the user's face at a predetermined frame rate. The infrared camera 4 has resolution that makes it possible to distinguish between a Purkinje image of the illumination light source 3, the Purkinje image being captured on the pupil of the user who uses the digital signage system 1, and the pupil in the image. Each time the infrared camera 4 generates an image, the infrared camera 4 passes the image to the processor 8.

Figure 2:
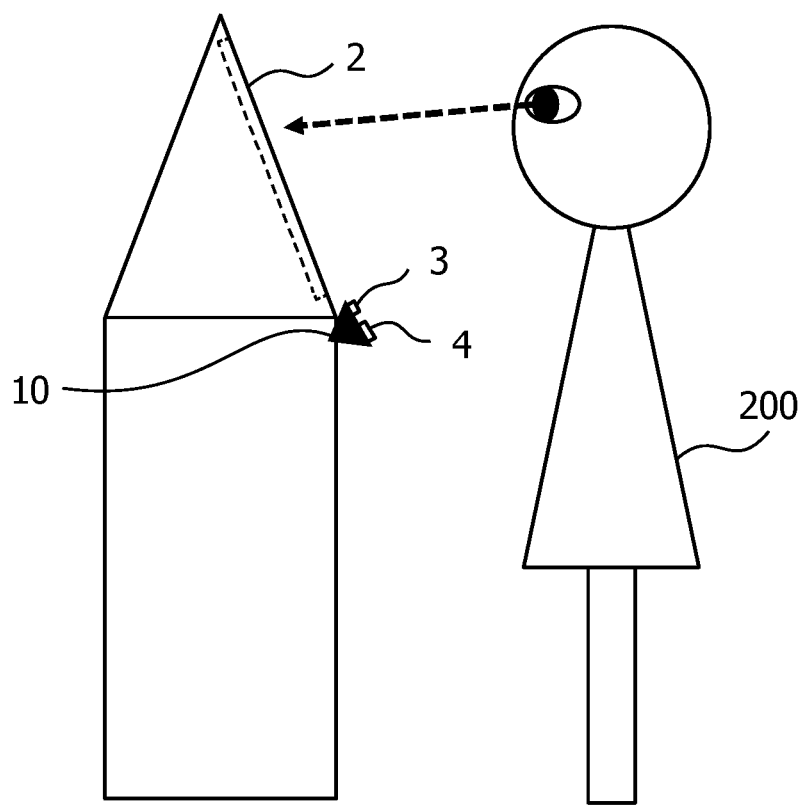
FIG. 2 illustrates an example of arrangement of an illumination light source, an infrared camera, and a display device.

FIG. 2 is a diagram illustrating an example of arrangement of the illumination light source 3, the infrared camera 4, and the display device 2. The housing 10 to which the illumination light source 3 and the infrared camera 4 are attached is arranged in the vicinity of the display device 2. The illumination light source 3 and the infrared camera 4 are directed to the face of a user 200 who views a display screen of the display device 2. The infrared camera 4 photographs the entire face or a part of the face of the user 200, the part including at least one of the eyes of the user 200.

The input device 5 includes, for example, a keyboard and a pointing device, such as a mouse. An operation signal that the user inputs via the input device 5 is passed to the processor 8.

The display device 2 and the input device 5 may be, for example, integrated together, like a touch panel display. In this case, when the user touches the position of an icon displayed on the display screen of the display device 2, the input device 5 generates an operation signal corresponding to the position and outputs the operation signal to the processor 8.

The storage-medium access device 6 is an example of a storage unit and is a device for accessing a storage medium 11. Examples of the storage medium 11 include a magnetic disk, a semiconductor memory card, and an optical storage medium. The storage-medium access device 6 reads, for example, a computer program for pupil detection processing, the computer program being stored in the storage medium 11, and passes the read computer program to the processor 8 for execution.

The memory 7 is another example of the storage unit and includes, for example, a readable/writable nonvolatile semiconductor memory and a readable/writable volatile semiconductor memory. The memory 7 stores therein the computer program for pupil detection processing and various application programs which are executed by the processor 8 and various data.

The memory 7 stores therein various data used for detecting a position at which the user is gazing. For example, the memory 7 stores therein a reference table indicating a relationship between the relative position of a pupil center relative to the barycenter of a Purkinje image and a line-of-sight direction.

The processor 8 includes at least one central processing unit (CPU) and a peripheral circuit thereof. The processor 8 may further include a numerical-value computation processor or a graphics processing unit (GPU). The processor 8 is connected to the individual elements in the digital signage system 1 through signal lines to control the entire digital signage system 1. For example, in accordance with an operation signal received from the input device and an application program that is being executed, the processor 8 causes the display device 2 to display a certain moving image and so on.

Each time an image is acquired, the processor 8 executes pupil detection processing to detect a user's pupil shown in the image and detects a line-of-sight direction and a gaze position of the user, based on the detected pupil.

Figure 3:
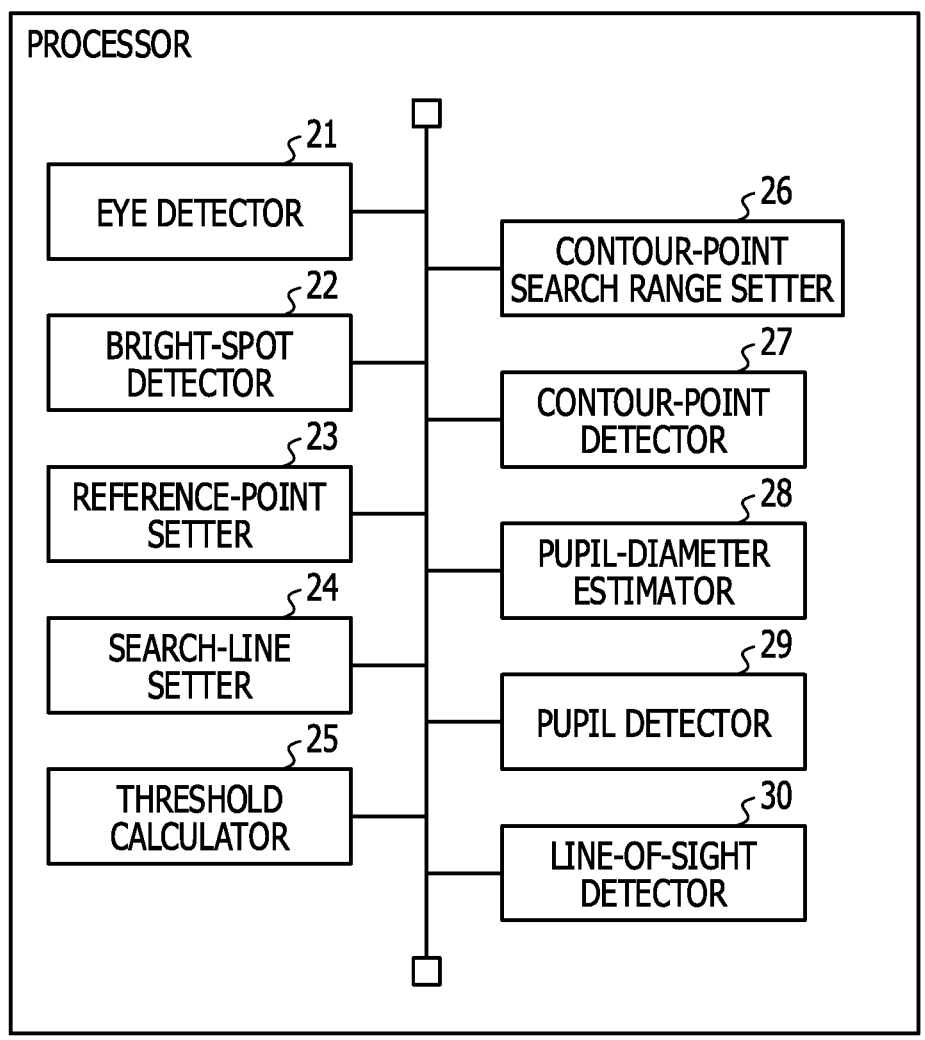
FIG. 3 illustrates an example of functional blocks for pupil detection processing, the functional blocks being included in a processor.

FIG. 3 illustrates an example of functional blocks related to the pupil detection processing, the functional blocks being included in the processor. The processor 8 includes an eye detector 21, a bright-spot detector 22, a reference-point setter 23, a search-line setter 24, a threshold calculator 25, a contour-point search range setter 26, a contour-point detector 27, a pupil-diameter estimator 28, a pupil detector 29, and a line-of-sight detector 30. The individual elements included in the processor 8 are functional modules realized by a computer program executed by the processor 8. The individual elements included in the processor 8 may be implemented as part of circuitry in the processor 8 that realizes the functions of the individual elements.

During execution of the pupil detection processing, each time an image is acquired, the eye detector 21 detects an eye area, which is an area in which the eye of the user is captured in the image. Since the eye detector 21 may execute the same processing on all images, processing on one image will be described below.

For example, when it is assumed that the entire face of the user is captured in an image, the eye detector 21 first detects a face area, which is an area in which the user's face is captured, from the image. To this end, the eye detector 21 converts, for example, the values of pixels in the image into values represented by an HSV color system. The eye detector 21 extracts, as face-area candidate pixels having a possibility that a part of the face is captured thereon, the pixels in which the values of hue components (H components) are values (for example, values in the range of 0° to 30°) corresponding to skin color.

When the user is using the digital signage system 1, it is assumed that the user's face faces the direction of the display device 2 and, is located a predetermined distance (for example, 1 to 2 m) away from the display device 2. Thus, it is also assumed that the area occupied by the face in the image has a certain degree of size.

The eye detector 21 performs labeling processing on the face-area candidate pixels and designates, as a face candidate area, a collection of face-area candidate pixels that are adjacent to each other. The eye detector 21 then determines whether or not the size of the face candidate area is included in a reference range corresponding to the size of the user's face. When the size of the face candidate area is included in the reference range corresponding to the user's face, the eye detector 21 determines that the face candidate area is a face area.

The eye detector 21 may add not only the size of the face candidate area but also the shape of the face candidate area to determination conditions for determining that the face candidate area is a face area. In general, the human face has a generally elliptical shape. Accordingly, for example, when the size of the face candidate area is included in the reference range, and the degree of circularity of the face candidate area is larger than or equal to a predetermined threshold corresponding to a typical face contour, the eye detector 21 may determine that the face candidate area is a face area. The eye detector 21 can calculate the degree of circularity by determining the total of pixels located on the contour of the face candidate area as the perimeter of the face candidate area and dividing the value, obtained by multiplying the total number of pixels in the face candidate area by 4π, by the square of the perimeter.

The eye detector 21 may also perform ellipse approximation on the face candidate area by assigning the coordinates of each pixel on the contour of the face candidate area to an elliptic equation and applying a least-squares method. When the ratio of the major axis of the ellipse to the minor axis thereof is included in the range of the ratios of the major axes to the minor axes of typical faces, the eye detector 21 may determine that the face candidate area is a face area. For evaluating the shape of the face candidate area by applying ellipse approximation, the eye detector 21 may detect edge pixels corresponding to edges by performing inter-neighborhood-pixel computation on brightness components of the pixels in the image. In this case, the eye detector 21 couples the edge pixels, for example, by using labeling processing and regarding, as the contour of the face candidate area, the edge pixels coupled to a certain length or more.

The eye detector 21 may detect a face area in, accordance with any of other various methods for detecting the area of a face captured in an image. For example, the eye detector 21 may perform template matching between the face candidate area and a template corresponding to a typical face shape to calculate the degree of, matching between the face candidate area and the template, and when the degree of matching is larger than or equal to a predetermined value, the eye detector 21 may determine that the face candidate area is a face area.

The eye detector 21 may detect the face area from the image by using a discriminator that has performed learning in advance so as to detect a face area from an image. In this case, for example, adaptive boosting (AdaBoost) or real AdaBoost, a support vector machine, or a deep neural network is used as the discriminator. The eye detector 21 sets a window in an image and determines whether or not the window is a face area by inputting the values of the pixels in the window or features extracted from the window to the discriminator while changing the position of the window. For example, Haar-like features or histograms of oriented gradients (HOG) features are extracted as the features.

With respect to at least one of the left and right eyes, the eye detector 21 detects an eye area from the face area.

The brightness of pixels corresponding to an eye greatly differs from the brightness of pixels corresponding to surroundings of the eye. With respect to the pixels in the face area, the eye detector 21 uses, for example, a Sobel filter to perform inter-neighborhood-pixel differential computation in the vertical direction to thereby detect edge pixels whose brightness changes in the vertical direction. For example, the eye detector 21 designates, as eye area candidates, areas each surrounded by two edge lines obtained by coupling, in the horizontal direction, a predetermined number or more of edge pixels corresponding to the size of the eye. The human has two eyes arranged side by side. The eye detector 21 extracts, of the detected eye area candidates, two eye area candidates that have a smallest vertical positional difference between the barycenters of the eye area candidates and that are horizontally away from each other by a distance corresponding to the gap between the left eye and the right eye. The eye detector 21 sets the two eye area candidates as eye areas.

By performing template matching between a template indicating eyes and the face area, the eye detector 21 may detect areas that match the template most and may set the detected areas as eye areas. The eye detector 21 may detect eye areas from the face area by using a discriminator that has performed learning in advance so as to detect eye areas from an image. In this case, for example, AdaBoost or real AdaBoost, a support vector machine, or a deep neural network is also used as the discriminator. The eye detector 21 may set a window of interest in the face area and may determine whether or not the window is an eye area by inputting the values of the pixels in the window or features extracted from the window to the discriminator.

The eye detector 21 may simultaneously detect the face area and the left and right eye areas by applying a deformable part model method to the image. For the deformable part model method, reference is made to, for example, P. Felzenszwalb, et al., "A discriminatively trained, multiscale, deformable part model", *Computer Vision and Pattern Recognition* 2008, IEEE Conference on Year, pp. 1-8, 2008.

When only a part of a face is captured in the image, the eye detector 21 may omit the face-area detection processing. The eye detector 21 may detect an eye area for at least one of the left and right eyes by performing any of the above-described eye area detection processing on an entire image.

The eye detector 21 passes information indicating the eye area to the bright-spot detector 22, the reference-point setter 23, the contour-point search range setter 26, and the pupil detector 29.

Each time the bright-spot detector 22 receives information indicating an eye area from the eye detector 21, the bright-spot detector 22 detects an area showing a bright spot (this area is hereinafter referred to as a "bright spot area") in the eye area.

The bright, spot that appears in the eye area is, for example, a Purkinje image of the illumination light source 3 or an image of the illumination light source 3 or another light source which is reflected by eyeglasses worn by the user. These images are significantly bright compared with other parts in the eye area, and the brightness values in the image are substantially saturated. For example, the brightness values are generally the largest value of brightness values that can be taken by the pixel values.

The bright-spot detector 22 detects pixels that are included in the eye area and whose brightness values are, larger than or equal to a predetermined threshold. The predetermined threshold may be, for example, 80% to 90% of the largest value of the brightness values in the eye area. The bright-spot detector 22 executes labeling processing on the detected collection of pixels and groups the detected collection of pixels into groups of pixels coupled together. The bright-spot detector 22 then detects each of the groups as one bright spot area.

In accordance with another scheme for detecting bright spots in an image, the bright-spot detector 22 may detect each bright spot area in the eye area. The bright-spot detector 22 calculates, for each detected bright spot area, the barycenter of the bright spot area and a distance (hereinafter referred to as a "spread distance", for the sake of convenience) from the barycenter to the pixel that is included in the bright spot area and that is the farthest from the barycenter. The bright-spot detector 22 reports each detected bright spot area, the barycenter of each bright spot area, and each spread distance thereof to the reference-point setter 23, the search-line setter 24, the contour-point search range setter 26, the contour-point detector 27, and the line-of-sight detector 30.

The reference-point setter 23 sets a reference point for setting a plurality of search lines for searching for the contour of a pupil.

In order that each search line and the contour of the pupil cross each other, the reference point is set in an area in which a pupil is assumed to be shown in the image. Since the pupil is generally dark compared with the surroundings of the pupil, the brightness of an area in which the pupil is shown in an image is lower than the brightness of an area in which the surroundings (such as the iris) of the pupil are shown. The area in which the pupil is shown in an image is assumed to have a certain degree of size in the image.

The reference-point setter 23 detects, as reference-point candidate pixels, pixels that are included in the eye area and whose brightness values are smaller than a predetermined second threshold. The second threshold may be, for example, a value obtained by subtracting a predetermined offset from the average value of brightness values in the eye area. The predetermined offset may be, for example, once to twice the standard deviation of brightness values in the eye area.

The reference-point setter 23 sequentially selects the reference point candidate pixels in order starting from the reference-point candidate pixel having the smallest brightness value. The reference-point setter 23 determines, as a degree of reliability representing a certainty that the selected reference-point candidate pixel is included in the pupil area, the distance from the selected reference-point candidate pixel to the closest pixel of the pixels whose brightness values are larger than or equal to the second threshold. The reference-point setter 23 sets, as a reference point, the reference-point candidate pixel having the highest degree of reliability.

It is assumed that a Purkinje image of the illumination light source 3 appears in the vicinity of the pupil. Accordingly, as a modification, the reference-point setter 23 may set a reference point among reference-point candidate pixels whose distances to the barycenter of the closest bright spot area of the bright spot areas detected by the bright-spot detector 22 are smaller than a predetermined distance threshold.

The reference-point setter 23 may set a plurality of reference points. In this case, for example, the reference-point setter, 23 may set, as reference points, a predetermined number (for example, 2 to 5) of reference-point candidate pixels in descending order of the degree of reliability.

The reference-point setter 23 reports the position of the set reference point to the search-line setter 24, the threshold calculator 25, the contour-point search range setter 26, and the contour-point detector 27.

The search-line setter 24 sets a plurality of search lines radially from the reference point. In this case, the search-line setter 24 sets, for example, the search lines so that the search lines are arranged at regular angular intervals. Although the number of search lines that are set is arbitrary, for example, 8 to 20 search lines are set so that the contour of the pupil can be determined with sufficient accuracy.

The search-line setter 24 determines whether or not each search line overlaps any of the bright spot areas. For example, with respect to a search line of interest, the search-line setter 24 determines whether or not each pixel on the search line up to a position that is a predetermined distance away from the reference point is included in any of the bright spot areas. When at least one of the pixels on the search line of interest is included in any of the bright spot areas, the search-line setter 24 determines that the search line of interest overlaps the bright spot area. Alternatively, the search-line setter 24 calculates a distance between the pixel located on the search line of interest and having the highest brightness and the barycenter of the bright spot area, and when the distance is smaller than a predetermined threshold, the search-line setter 24 may determine that the search line of interest overlaps the bright spot area. In this case, the predetermined threshold may be, for example, a value obtained by adding a predetermined offset value (for example, one to three pixels) to the spread distance of the bright spot area. The state in which the search line and the bright spot area overlap each other may hereinafter be expressed as "the search line passes through the bright spot area".

Figure 4:
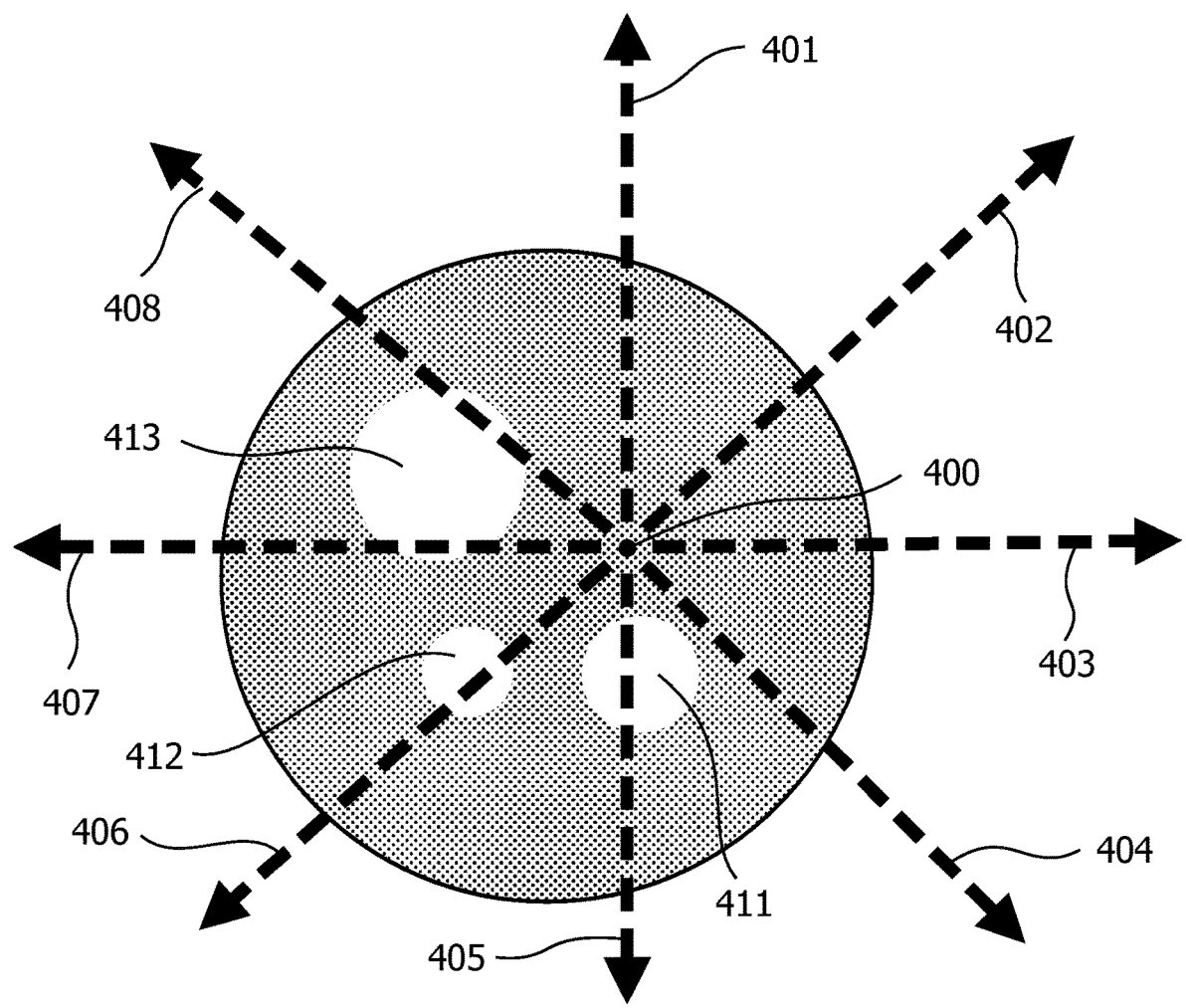
FIG. 4 illustrates an example of a reference point and search lines.

FIG. 4 illustrates an example of a reference point and search lines. In the example illustrated in FIG. 4, eight search lines 401 to 408 are radially set centered on a reference point 400 at regular angular intervals. Also, in this example, three bright spot areas 411 to 413 are detected. Of the eight search lines 401 to 408, the search lines 401 to 404 do not overlap any of the bright spot areas 411 to 413. Thus, the search lines 401 to 404 are referred to in order to calculate a threshold for the brightness value, the threshold being used for detecting the contour of the pupil.

The search line 405 overlaps the bright spot area 411, and the search line 406 overlaps the bright spot area 412. The search lines 407 and 408 overlap the bright spot area 413. Thus, with respect to each of the search lines 405 to 408, the contour-point search range setter 26 sets a search ranges and detects contour points of the pupil in the set search range.

When a plurality of reference points is set, the search-line setter 24 may set a plurality of search lines for each reference point. The search-line setter 24 may cause the threshold calculator 25, the contour-point search range setter 26, and the contour-point detector 27 to execute processing on, of the plurality of reference points, the reference point with which the number of search lines that pass through the bright spot areas is the smallest.

The search-line setter 24 reports the search lines that do not overlap any of the bright spot areas to the threshold calculator 25 and the contour-point detector 27 and reports the search lines that overlap the bright spot areas to the contour-point search range setter 26 and the contour-point detector 27.

The threshold calculator 25 calculates a threshold for a brightness value corresponding to the contour of a pupil, the threshold being used for detecting the contour points of a pupil.

Figure 5:
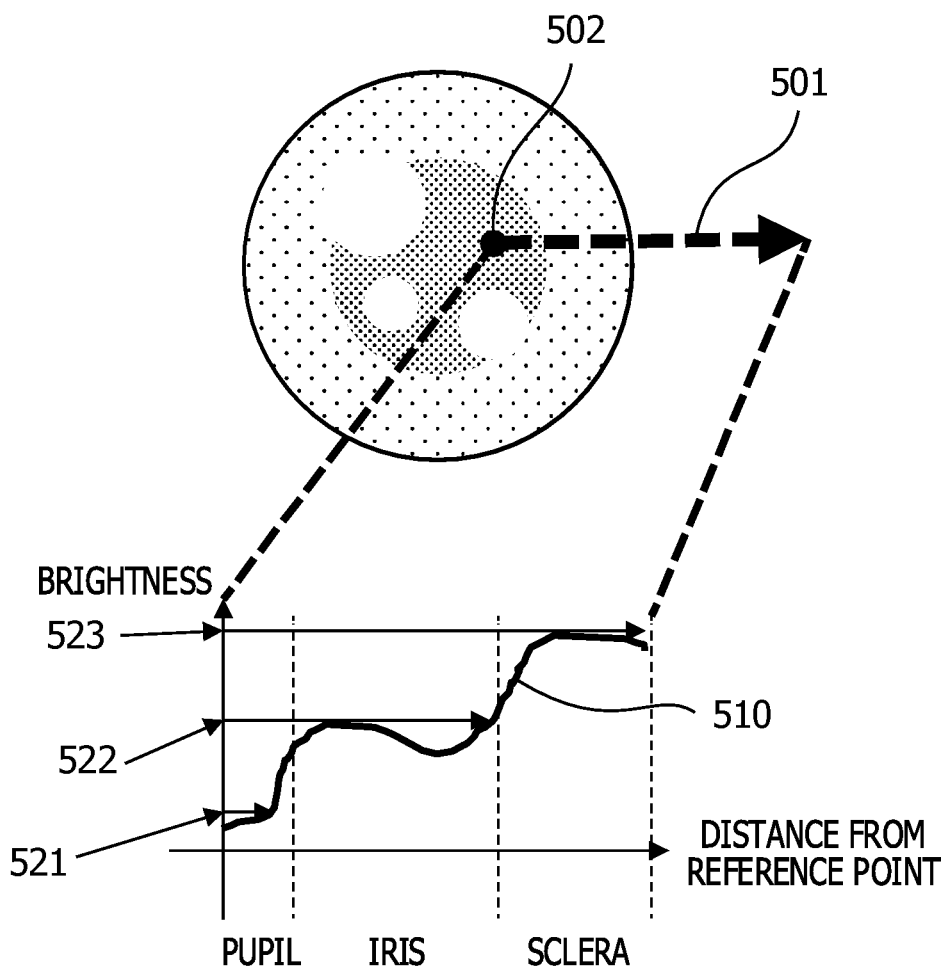
FIG. 5 illustrates an example of a relationship between a distance from a reference point along a search line and brightness.

FIG. 5 illustrates an example of a relationship between a distance from a reference point along a search line and brightness. In FIG. 5, the horizontal axis represents a distance from a reference point, and the vertical axis represents a brightness value. A profile 510 indicates a relationship between the distance from a reference point 502 along a search line 501 set in an eye area and brightness.

As indicated by the profile 510, the brightness of the area in which the pupil is shown in the image is lower than the brightness of a surrounding area of the pupil, for example, an area in which the iris is shown. A brightness value variation due to a difference of a position in the area in which the pupil is shown and a brightness value variation due to a difference of a position in the area in which the iris is shown are small. On the other hand, in the vicinity of a boundary between the area in which the pupil is shown and the area in which the iris is shown, the brightness value changes sharply. Similarly, in the vicinity of a boundary between the area in which the iris is shown and an area in which the sclera is shown, the brightness value changes sharply.

Accordingly, while increasing a reference value in increments of a predetermined value, the threshold calculator 25 calculates, for each reference value, a distance along a search line from the reference point to the first pixel that reaches a brightness value larger than or equal to the reference value. The initial value of the reference value may be set to a brightness value at the reference point. The predetermined value may be set so as to be smaller than a brightness value difference between the pupil and the iris. The threshold calculator 25 calculates a derivative value of the distance with respect to a brightness change by differentiating the distance obtained for each reference value with respect to the brightness value. As indicated by arrows 521 to 523 in FIG. 5, in each of brightness corresponding to the pupil, brightness corresponding to the iris, and brightness corresponding to the sclera, the derivative value of a distance with respect to a brightness change becomes the largest. In particular, the second largest value in ascending order of the brightness values is the brightness corresponding to the iris.

Accordingly, with respect to each search line that does not overlap a bright spot area, the threshold calculator 25 calculates a derivative value of a distance variation with respect to a brightness change, as described above, and uses, as the brightness value of the iris, the brightness at which the derivative value of the distance variation is the second largest value in ascending order of the brightness values. The threshold calculator 25 calculates, as an upper limit brightness value of the pupil, the average value of brightness values of the iris which are obtained for each search line. In the calculation, the threshold calculator 25 may calculate the average value of brightness values excluding the largest and smallest values of the iris brightness values calculated for each search line and may use the average value as the upper limit brightness value of the pupil. The threshold calculator 25 may also use, as the upper limit brightness value of the pupil, the median of the iris brightness values calculated for each search line.

For example, the threshold calculator 25 sets, as a brightness threshold, a brightness value that is larger than the average value of brightness values of the reference point and surrounding pixels (for example, pixels within two pixels from the reference point) thereof by a predetermined brightness offset or more and that is smaller than the upper limit brightness value of the pupil. In the setting of the brightness threshold, the threshold calculator 25 calculates, in ascending order of the brightness values for each search line, a brightness for which the derivative value for the distance variation is the smallest value (this brightness is hereinafter referred to as "edge brightness", for the sake of convenience) between the brightness for which the derivative value for the distance variation is a first largest value and the brightness for which the derivative value for the distance variation is a second largest value. Since a change in the distance from the reference point with respect to a change in the brightness value is small in the vicinity of the edge brightness, the edge brightness is estimated to be a brightness value in the vicinity of a boundary between two areas in which the brightness values differ from each other. Accordingly, the threshold calculator 25 may use the average value or the median of the edge brightnesses for each search line as the brightness threshold.

The threshold calculator 25 reports the brightness threshold to the contour-point search range setter 26 and the contour-point detector 27.

With respect to a bright spot area that overlaps a search line, the contour-point search range setter 26 determines the degree of overlapping between the bright spot area and the pupil, based on the brightness threshold and the brightness values of the circumference of the bright spot area. In accordance with the degree of overlapping between the bright spot area and the pupil, the contour-point search range setter 26 sets a range in which the contour of the pupil is to be searched for with respect to the search line that overlaps the bright spot area.

Figure 6:
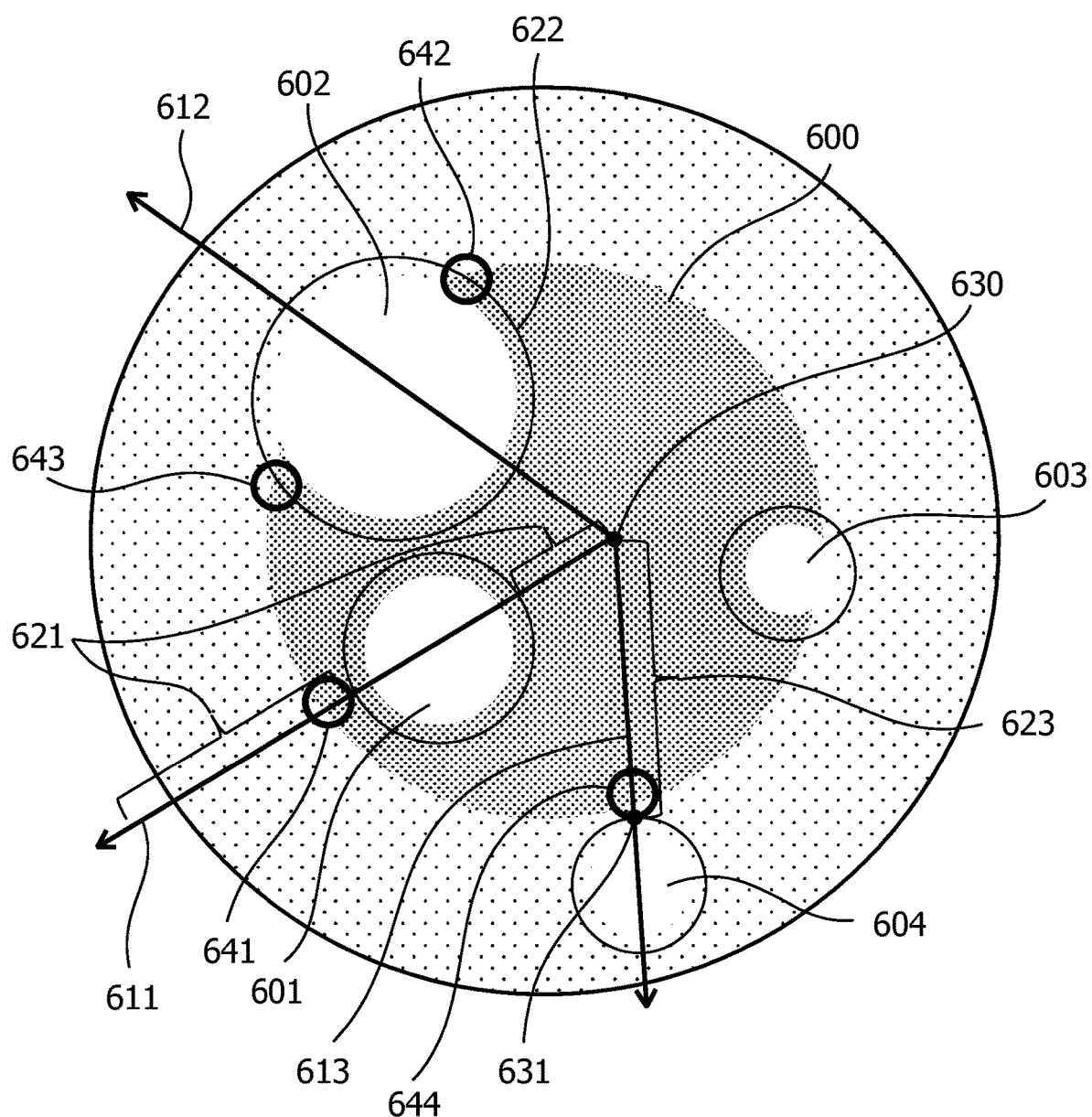
FIG. 6 illustrates an example of a positional relationship between the pupil and bright spot areas.

FIG. 6 illustrates an example of a positional relationship between the pupil and bright spot areas. In FIG. 6, four bright spot areas 601 to 604 are detected. Of the bright spot areas 601 to 604, the entire bright spot area 601 is included in a pupil 600. The bright spot areas 602 and 603 partially overlap the pupil 600. The bright spot area 604 does not overlap the pupil 600.

When attention is paid to the bright spot area 601, since the entire bright spot area 601 is included in the pupil 600, the brightness values of pixels located on the circumference of the bright spot area 601 have brightness values corresponding to the pupil, that is, are lower than the brightness threshold. For the bright spot area 602, a part of the circumference of the bright spot area 602 is included in the pupil 600, and another part of the circumference is located outside the pupil 600. Thus, the brightness values of some of the pixels located on the circumference of the bright spot area 602 are smaller than the brightness threshold, and the brightness values of other pixels of the pixels located on the circumference of the bright spot area 602 are larger than or equal to the brightness threshold. The same applies to the bright spot area 601. In addition, for the bright spot area 604, since the entire bright spot area 604 is located outside the pupil 600, the brightness values of pixels located on the circumference of the bright spot area 604 are larger than or equal to the brightness threshold.

With respect to each bright spot area that overlaps search line, the contour-point search range setter 26 compares the brightness values of the respective pixels along the circumference of the bright spot area with the brightness threshold. When the brightness values of the respective pixels on the circumference are smaller than the brightness threshold, the contour-point search range setter 26 determines that the bright spot area is located in the pupil. On the other hand, when the brightness values of some of the pixels on the circumference are smaller than the brightness threshold, and the brightness values of other pixels of the pixels thereon are larger than or equal to the brightness threshold, the contour-point search range setter 26 determines that the bright spot area partially overlaps the pupil. In addition, when the brightness values of the pixels on the circumference are larger than or equal to the brightness threshold, the contour-point search range setter 26 determines that the bright spot area is located outside the pupil. For example, the contour-point search, range setter 26 uses, as the circumference of the bright spot area, a circle having its center at the barycenter of the bright spot area and having a radius with a value obtained by adding a predetermined offset (for example, one to three pixels) to the spread distance.

The contour-point search range setter 26 classifies search lines that pass through bright spot areas into three types described below.

(A) A search line that passes through a bright spot area that exists in the pupil (B) A search line that passes through a bright spot area that partially overlaps the pupil (C) A search line that passes through a bright spot area that does not overlap the pupil With respect to each of (A) to (C), the contour-point search range setter 26 sets a search range, as described below.

With respect to (A) a search line that passes through a bright spot area that exists in the pupil, the contour-point search range setter 26 sets, as search ranges, collections of pixels obtained by excluding the pixels included in a portion where the search line and the bright spot area overlap each other from the pixels on the search line. For example, in FIG. 6, with respect to a search line 611 that passes through the bright spot area 501 collections of pixels on the search line 611 other than a portion that overlaps the bright spot area 601 are set as search ranges 621. This makes it possible to minimize the possibility that the boundary of the bright spot area on the search line is falsely detected as contour points of the pupil and makes it possible to detect the real pupil contour located at a position farther than the bright spot area when viewed from the reference point.

With respect to (B) a search line that passes through a bright spot area that partially overlaps the pupil, the contour points of the pupil on the search line are assumed to exist in the bright spot area. Thus, the contour points of the pupil are not detected on the search line. Accordingly, with respect to a search line that passes through a bright spot area that partially overlaps the pupil, the contour-point search range setter 26 sets the circumference of the bright spot area as a search range. For example, in FIG. 6, with respect to a search line 612 that passes through the bright spot area 602, a collection of pixels on the circumference of the bright spot area 602 is set as a search range 622.

With respect to (C) a search line that passes through a bright spot area that does not overlap the pupil, the contour-point search range setter 26 sets, as a search range, a range along the search line from the reference point to a position where the search line and the bright spot area intersect each other. For example, in FIG. 6, with respect to a search line 613 that passes through the bright spot area 604, an area from a reference point 630 to an intersection 631 between the bright spot area 604 and the search line 613, the intersection 631 being the closest to the reference point 630, is set as a search range 623.

The contour-point search range setter 26 reports, for each search line, the set search range to the contour-point detector 27.

The contour-point detector 27 detects a contour point of the pupil for each search line. In the detection, with respect to the search line that passes through the bright spot area, the contour-point detector 27 detects a contour point of the pupil in a search range set for the search line.

With respect to the search line that does not overlap the bright spot area, the contour-point detector 27 compares the brightness values of the pixels with the brightness threshold in order starting from the pixel that is closest to the reference point along the search line. The contour-point detector 27 detects, as a contour point of the pupil, the pixel that is immediately before the first pixel whose brightness value becomes larger than or equal to the brightness threshold.

With respect to the search line that passes through the bright spot area, the contour-point detector 27 compares the brightness values of the pixels with the brightness threshold in order starting from the pixel that is included in the search range set for the search line and that is the closest to the reference point. The contour-point detector 27 detects, as a contour point of the pupil, the pixel immediately before the first pixel whose brightness value becomes larger than or equal to the brightness threshold. When the circumference of a bright spot area is set as a search range, the contour-point detector 27 sets, as a search start point, the intersection closer to the reference point of two intersections between the circumference of the bright spot area and the search line. The contour-point detector 27 then sequentially compares the brightness values of the pixels at both sides from the search start point along the circumference of the bright spot area with the brightness threshold. With respect to each of both sides of the search start point, the contour-point detector 27 detects, as a contour point of the pupil, the pixel that is immediately before the first pixel whose brightness value becomes larger than or equal to the brightness threshold.

Referring to FIG. 6 again, for example, with respect to the search line 611 that passes through the bright spot area 601 located in the pupil 600, the intersection between the contour of the pupil 600, the intersection being located farther than the bright spot area 601 when viewed from the reference point 630, and the search line 611 is detected as a contour point 641. Also, with respect to the search line 612 that passes through the bright spot area 602 that partially overlaps the pupil 600, two intersections between the circumference of the bright spot area 602 and the contour of the pupil 600 are detected as contour points 642 and 643. With respect to the search line 613 that passes through the bright spot area 604 that does not overlap the pupil 600, an intersection between the contour of the pupil 600 and the search line 613, the intersection being closer to the reference point 630 than from the bright spot area 604, is detected as a contour point 644.

In a case in which the circumference of the bright spot area is set as a search range, when the reference point is located in the pupil, the intersection that is closer to the reference point of the two intersections between the circumference of the bright spot area and the search line is also generally located in the pupil, and thus the brightness value at the intersection is also smaller than the brightness threshold. For example, depending on the situation, the brightness value at the intersection that is closer to the reference point of the two intersections between the circumference of the bright spot area and the search line may be larger than or equal to the brightness threshold. In such a case, the contour-point detector 27 may or may not detect a contour point of the pupil in the search range set on the circumference of the bright spot area.

FIGS. 7A to 7D illustrate examples of a relationship between a change in brightness on the circumference of a bright spot area and contour points of the pupil. In each of FIGS. 7A to 7D, it is assumed that a circumference 701 of a bright spot area through which a search line 700 passes is set as a search range. It is assumed that, of two intersections between the search line 700 and the circumference 701, an intersection A is closer to a reference point 702. In addition, each arrow 710 represents an edge position that is a candidate of a contour point of the pupil. That is, each arrow 710 indicates that the brightness of pixels at the tail side of the arrow 710 is larger than or equal to a brightness threshold, and the brightness of pixels at the head side of the arrow 710 is smaller than the brightness threshold.

Figure 7A:
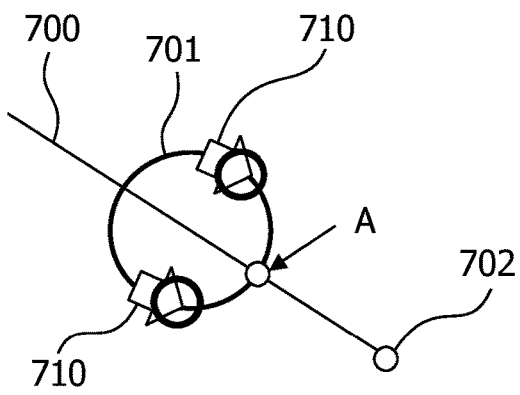
FIGS. 7A to 7D illustrate examples of a relationship between a change in brightness on the circumference of a bright spot area and contour points of the pupil.

In the example illustrated in FIG. 7A, each of two edge positions at both sides of the intersection A has brightness that decreases toward the intersection A, as indicated by the arrow 710, and the brightness at the intersection A is smaller than the brightness threshold. Thus, the contour points of the pupil are detected at the two edge positions.

Figure 7B:
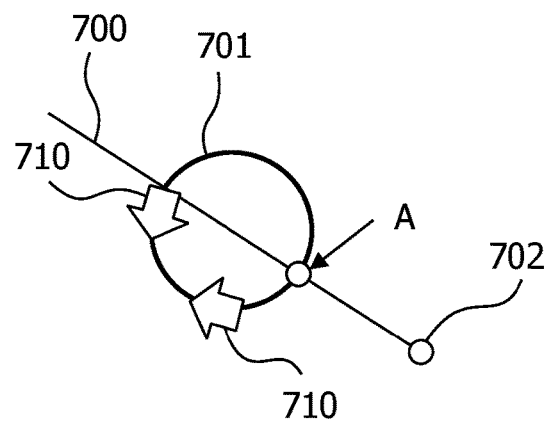

In the example illustrated in FIG. 7B, each of the two edge positions at both ends of the intersection A has a brightness that increases toward the intersection A, as indicated by arrows 710, and the brightness at the intersection A is larger than or equal to the brightness threshold. In this case, a contour point of the pupil is not detected at each of the edge positions indicated by the arrows 710.

Figure 7C:
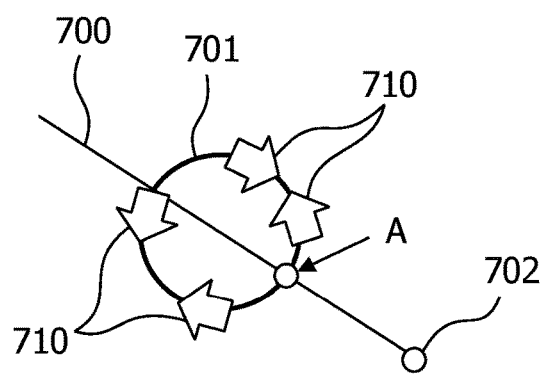

Similarly, in the example illustrated in FIG. 7C, although there are four edge positions, two edge positions that are adjacent to the intersection A have brightness that increases toward the intersection A, as indicated by arrows 710, and the brightness at the intersection A is larger than or equal to the brightness threshold. Thus, in this case, a contour point of the pupil is not detected at each of the edge positions.

Figure 7D:
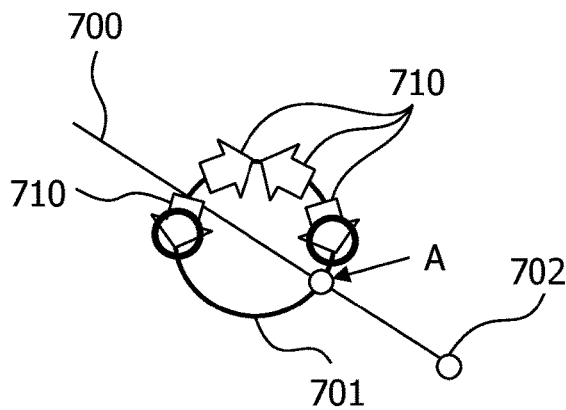

Conversely, in the example illustrated in FIG. 7D, of four edge positions, two edge positions adjacent to the intersection A have brightness that decreases toward the intersection A, as indicated by arrows 710, and the brightness at the intersection A is smaller than the brightness threshold. Thus, contour points of the pupil are detected at the two edge positions adjacent to the intersection A.

The contour-point detector 27 may be adapted so as not to detect a contour point of the pupil from the circumference of a bright spot area when the brightness of a farther intersection of two intersections between a search line and the circumference of the bright spot area is smaller than the brightness threshold.

By determining whether or not a contour point of the pupil is to be detected, based on the brightness at the intersection between a search line and the circumference of a bright, spot area, the contour-point detector 27 can suppress the possibility that a pixel indicating an edge that is not a contour point of the pupil is falsefully detected as a contour point.

The contour-point detector 27 reports the positions of the contour points detected for the search lines to the pupil-diameter estimator 28.

The pupil-diameter estimator 28 estimates a pupil diameter, based on the positions of the contour points detected for the search lines. To this end, for example, the pupil-diameter estimator 28 determines, as the estimated value of the pupil diameter, the diameter of a circle obtained by circle approximation on the detected contour points by using a least-squares method. The pupil-diameter estimator 28 estimates, as a candidate of the center position of the pupil, the center of the circle obtained by the circle approximation.

The pupil-diameter estimator 28 reports the estimated value of the pupil diameter and the candidate of the center position of the pupil to the pupil detector 29.

The pupil detector 29 detects the pupil, based on the estimated value of the pupil diameter and the candidate of the center position of the pupil.

The pupil detector 29 performs, for example, template matching between a template corresponding to a pupil and the eye area to detect an area that is included in the eye area and that has the highest degree of matching with the template. The pupil detector 29 determines the detected area as the pupil. During the determination, the pupil detector 29 uses a template indicating a pupil having a diameter corresponding to the estimated value of the pupil diameter. The pupil detector 29 may set a search range having its center at the candidate of the center position of the pupil and execute template matching in the search range. Based on the estimated value of the pupil diameter and the candidate of the center position of the pupil which are obtained by the pupil-diameter estimator 28, the pupil detector 29 limits the number of templates in which the pupil sizes differ from each other and the search range, the templates and the search range being used for pupil detection. Thus, the processing time is reduced.

The brightness of an area in which the pupil is captured is lower than the brightness of an area in the surroundings thereof, and the pupil is generally circular. For example, the pupil detector 29 sets, in the eye area, a double ring filter having two rings having different radii concentrically. In the setting, the diameter of the inner ring is used as the estimated value of the pupil diameter. When a difference value obtained by subtracting the average value of brightnesses of pixels corresponding to the inner ring from the average value of brightnesses of pixels corresponding to the outer ring is larger than a predetermined threshold, the pupil detector 29 may determine the area surrounded by the inner ring as a pupil. A condition that the average of brightness values in an area surrounded by the inner ring is smaller than a predetermined threshold may be added to conditions for the pupil detector 29 to detect the area as a pupil. In this case, the predetermined threshold is set to, for example, a value obtained by adding 10% to 20% of a difference between the largest brightness value and the smallest brightness value in the eye area to the smallest brightness value. In this case, the pupil detector 29 also limits the number of double ring filters having different sizes and used for the pupil detection, based on the pupil-diameter estimated value obtained by the pupil-diameter estimator 28, and thus the processing time is reduced.

The pupil detector 29 calculates, as the coordinates of the center position of the pupil, the average value of horizontal coordinate values and the average value of vertical coordinate values of pixels included in the area in which the detection pupil is shown. The pupil detector 29 reports the detected pupil center position to the line-of-sight detector 30.

Each time the pupil center position is reported from the pupil detector 29, the line-of-sight detector 30 detects a line-of-sight direction and a gaze position of the user, based on the pupil center position.

Since the surface of the cornea is generally spherical, the position of a Purkinje image of a light source is substantially the same, regardless of the line-of-sight direction. The center position of the pupil, on the other hand, moves in response to the line-of-sight direction. Thus, the line-of-sight detector 30 may detect the line-of-sight direction, based on a relative positional relationship of the pupil center position relative to the barycenter of a Purkinje image of the illumination light source 3.

The line-of-sight detector 30 determines the relative position of the center of the pupil relative to the barycenter of a Purkinje image of the illumination light source 3. In this case, the line-of-sight detector 30 determines the relative position of the center of the pupil, for example, by subtracting the horizontal coordinate and the vertical coordinate of the barycenter of the Purkinje image from the horizontal coordinate and the vertical coordinate of the center of the pupil. The line-of-sight detector 30 then determines the line-of-sight direction by referring to a reference table indicating a relationship between the relative position of a pupil center and the line-of-sight direction.

The line-of-sight detector 30 further detects the gaze position of the user, based on the detected line-of-sight direction. The line-of-sight detector 30 determines the gaze position by referring to a gaze-position table indicating a relationship between the line-of-sight direction and the gaze position. The relationship between the line-of-sight direction and the gaze position varies depending on the distance between the gaze position (for example, the display screen of the display device 2) and the user. The horizontal width of the face in the image also varies depending on the distance between the infrared camera 4 and the user. Since the infrared camera 4 is arranged in the vicinity of the display device 2, it is assumed that the distance between the infrared camera 4 and the user and the distance between the gaze position of the user and the user are generally equal to each other.

A plurality of gaze-position tables is prepared depending on likely distances (for example, 1 m, 2 m, and so on) between the infrared camera 4 and the user who uses the digital signage system 1 and is stored in the memory 7. In each gaze-position table, a corresponding range of widths of a horizontal face area in an image according to the distance between the infrared camera 4 and the user is associated. The line-of-sight detector 30 selects the gaze-position table in which the horizontal width of a most recent face area is included in the range, the face area being received from the eye detector 21. The line-of-sight detector 30 determines a gaze position corresponding to the line-of-sight direction, by referring to the selected gaze-position table. When the digital signage system 1 has a distance sensor, such as a depth camera, the line-of-sight detector 30 may select the gaze-position table in accordance with the distance to the user which is obtained by the distance sensor.

FIG. 8 illustrates an example of a gaze-position table. Line-of-sight directions are shown in an upper-end row in a gaze-position table 800. In each field in the gaze-position table 800, the coordinates of a gaze position corresponding to the line-of-sight direction in the same column are indicated by a predetermined unit (for example, a pixel unit on the display screen of the display device 2 or units of mm). For example, a field 801 in the gaze-position table 800 indicates that a gaze position when the line-of-sight direction is horizontally 0° and is vertically 1° is (cx, cy+40). In this case, cx and cy indicate the coordinates of a gaze position when the line-of-sight direction is (0, 0), that is, the coordinates of a reference gaze position. For example, cx and cy are, on a vertical plane, a horizontal coordinate and a vertical coordinate of a position where the infrared camera 4 is installed.

The line-of-sight detector 30 stores the gaze position and the line-of-sight direction of the user in the memory 7.

When a plurality of bright spot areas is detected in the eye area, one of the plurality of bright spot areas is assumed to be a Purkinje image of the illumination light source 3. Accordingly, in this case, the line-of-sight detector 30 determines that, for example, a bright spot area that is included in the plurality of bright spot areas and that is the closest to a Purkinje image detected in the immediately previous image is a Purkinje image of the illumination light source 3. Also, when the user wears eyeglasses, light from the illumination light source 3 is also reflected by the eyeglasses. Thus, there are cases in which any of the bright spot areas is a reflection image from the illumination light source 3 owing to the eyeglasses. In general, the curvature of an eyeglass lens is smaller than the curvature of the eyeball. Thus, the reflection image of the illumination light source 3 owing to the eyeglasses becomes large compared with a Purkinje image of the illumination light source 3. Accordingly, the line-of-sight detector 30 may determine that, off plurality of bright spot areas, the bright spot area having the smallest diameter is a Purkinje image of the illumination light source 3.

Based on line-of-sight directions detected from a plurality of most recent images, the line-of-sight detector 30 may predict the line-of-sight direction in a present image, for example, by using a prediction filter, such as a Kalman filter. The line-of-sight detector 30 then may calculate the difference between each line-of-sight direction determined when each of the bright spot areas is assumed to be a Purkinje image of the illumination light source 3 and the predicted line-of-sight direction and may determine the bright spot area corresponding to the line-of-sight direction when the difference is the smallest as a Purkinje image of the illumination light source 3. The line-of-sight detector 30 determines that the line-of-sight direction when the difference from the predicted line-of-sight direction is, the smallest is the actual line-of-sight direction of the user.

The position at which the user gazes with his or her left eye and the position at which the user gazes with his or her right eye are assumed to be the same. Accordingly, when the pupils and bright spot areas for the respective eyes of the user are detected in one image, the line-of-sight detector 30 determines candidates of a gaze position for each bright spot area with respect to each of the left eye and the right eye, assuming that each bright spot area is a Purkinje image of the illumination light source 3. The line-of-sight detector 30 may also determine that, of combinations of candidates of a left eye gaze position and candidates of a right eye gaze position, the combination with which the distance between the candidates of the gaze positions is the smallest is an actual gaze position.

The processor 8 locates the position at which or a range in which the gaze position stays for a certain amount of time or more, by tracking the gaze position of the user. The processor 8 then executes processing corresponding to the position or the range. For example, the processor 8 may cause the display device 2 to display information relevant to an icon or content displayed on the display device 2, the icon or the content being included in the position or the range.

Figure 9:
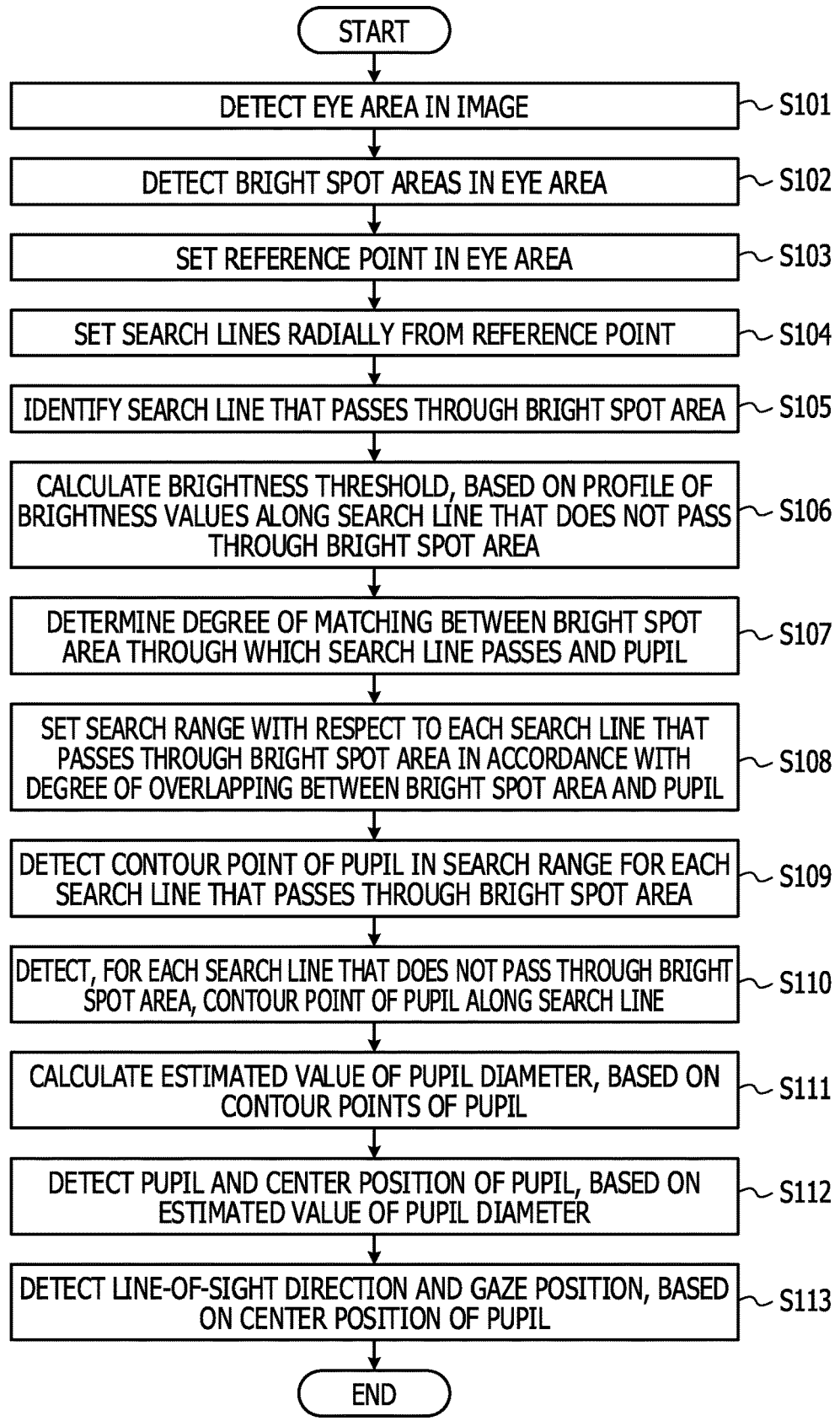
FIG. 9 illustrates an example of pupil detection processing.

FIG. 9 illustrates an example of pupil detection processing. Each time an image is acquired, the processor 8 executes the pupil detection processing in accordance with an operation flow described below.

The eye detector 21 detects an eye area in an image obtained from the infrared camera 4 (operation S101). The bright-spot detector 22 then detects bright spot areas in the eye area (operation S102).

The reference-point setter 23 sets a reference point in the eye area (operation S103). The search-line setter 24 sets a plurality of search lines radially from the reference point (operation S104). The search-line setter 24 identifies, of the set search lines, a search line that passes through any of the bright spot areas (operation S105).

Based on a profile of brightness values along a search line that does not pass through any of the bright spot areas, the threshold calculator 25 calculates a brightness threshold for detecting contour points of the pupil (operation S106). Also, with respect to each of the bright spot areas that overlap the search lines, the contour-point search range setter 26 determines the degree of matching between the bright spot area and the pupil, based on brightness values on the circumference of the bright spot area and the brightness threshold (operation S107). With respect to each search line that passes through any of the bright spot areas, the contour-point search range setter 26 sets a search range for a contour point of the pupil in accordance with the degree of overlapping between the bright spot area through which the search line passes and the pupil (operation S108).

The contour-point detector 27 detects, for each search line that passes through the bright spot area, a contour point of the pupil in the search range set for the search line (operation S109). The contour-point detector 27 detects, for each search line that does not pass through the bright spot area, a contour point of the pupil along the search line (operation S110). Based on the contour points detected for the search lines, the pupil-diameter estimator 28 calculates an estimated value of the pupil diameter (operation S111).

Based on the estimated value of the pupil diameter, the pupil detector 29 detects the pupil and the center position of the pupil in the eye area (operation S112). Based on the center position of the pupil, the line-of-sight detector 30 detects a line-of-sight direction and a gaze position of the user (operation S113). The processor 8 ends the pupil detection processing.

Figure 10:
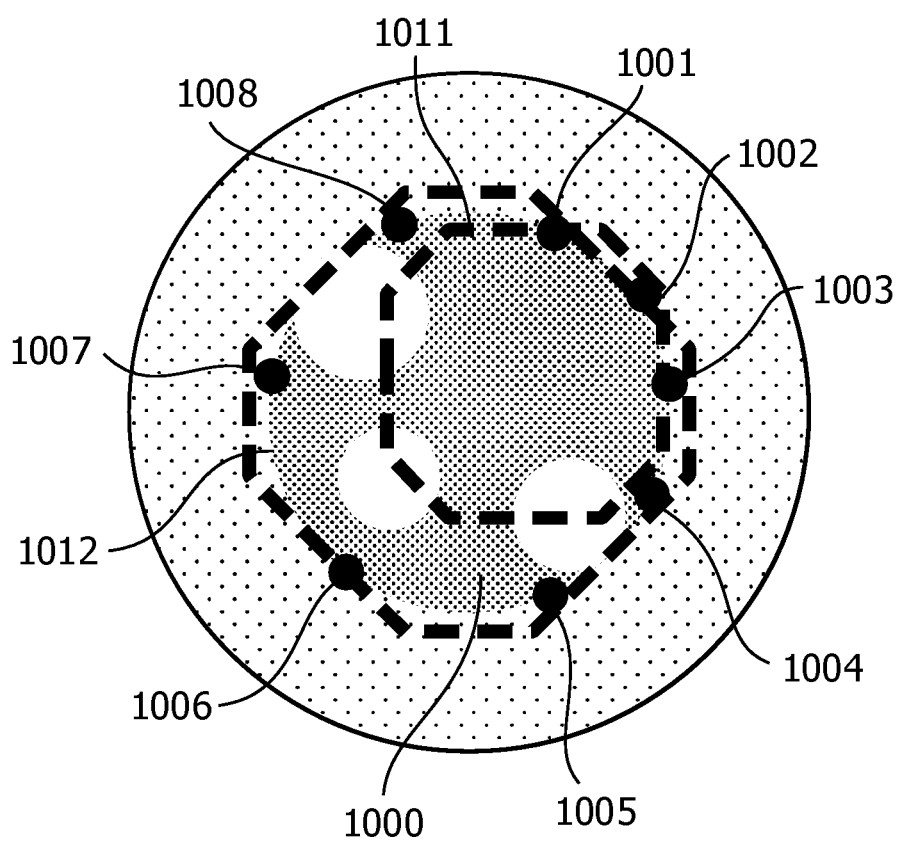
FIG. 10 illustrates an example of a relationship between the number of detected contour points and an estimated value of the pupil diameter.

FIG. 10 illustrates an example of a relationship between the number of detected contour points and an estimated value of the pupil diameter. In FIG. 10, contour points 1001 to 1003 are contour points of a pupil 1000 which were detected on search lines that do not pass through any bright spot area. Contour points 1004 to 1008, on the other hand, are contour points of the pupil 1000 which were detected in search ranges set for search lines that pass through bright spot areas.

The contour of the pupil 1000 which is estimated based on the contour points 1001 to 1003 varies greatly depending on slight error in the detection positions of the contour points 1001 to 1003, since the number of contour points used for the estimation is small. In particular, as illustrated in FIG. 10, when the positions of the detected contour points are not evenly distributed, for example, the estimated contour may differ greatly from the actual contour of the pupil 1000, as indicated by a dotted line 1011.

In contrast, since the contour of the pupil 1000 which is estimated based on the contour points 1001 to 1008 is generally equal to the actual contour of the pupil 1000, as indicated by a dotted line 1012, since the number of contour points on the contour which is used for the estimation is large. Thus, it can be understood that this, pupil detecting device can detect the pupil with high accuracy.

As described above, this pupil detecting device determines the degree of overlapping between a bright spot area that exists in an eye area and the pupil, and sets a search range for a contour point of the pupil with respect to a search line that passes through the bright spot area, in accordance with the degree of overlapping. Thus, this pupil detecting device can improve the accuracy of detecting the contour points of the pupil, even when a bright spot area is included in the pupil, or the bright spot area and the pupil partially overlap each other. In particular, even when a plurality of bright spot areas is detected in an eye area, this pupil detecting device can set, for each bright spot area, an appropriate search range in which a contour point of the pupil is highly likely to exist with respect to a search line that passes through the bright spot area. Thus, this pupil detecting device can detect the pupil, captured in an image, with high accuracy. In addition, since the pupil detecting device can perform processing for setting the search range with a relatively small amount of computation, it is possible to reduce the amount of computational load for pupil detection.

When the user is not looking in the direction of the infrared camera 4, there are cases in which the pupil is captured on an image in the shape of an ellipse Thus, according to the modification, by using a least-squares method, the pupil-diameter estimator 28 may perform ellipse approximation on the contour points of the pupil which are detected for the respective search line. The pupil-diameter estimator 28 may also report, to the pupil detector 29, the diameters of the major and minor axes of the approximated ellipse and a tilt angle of the major axis relative to the horizontal direction of the image. By using the reported diameters of the major and minor axes and a template indicating a pupil having the tilt angle of the major axis relative to the horizontal direction of the image, the pupil detector 29 may perform template matching with the eye area in the image to thereby detect the pupil.

The pupil-diameter estimator 28 may also use, as the center position of the pupil, the center of a circle obtained by performing circle approximation on the contour points with respect to the search lines or the center of an ellipse obtained by performing ellipse approximation on the contour points with respect to the search lines. In this case, the pupil-diameter estimator 28 is another example of the pupil detector. Thus, according to this modification, the pupil detector 29 may be omitted.

When the reference-point setter 23 sets a plurality of reference points, the search-line setter 24, the threshold calculator 25, the contour-point search range setter 26, and the contour-point detector 27 may perform processing for each reference point. The pupil-diameter estimator 28 may perform, for each reference point, ellipse approximation on a collection of detected contour points of the pupil. The pupil-diameter estimator 28 may also use, as the estimated value of the pupil diameter, the major axis diameter or the minor axis diameter of an ellipse (for example, an ellipse having the smallest difference between the major axis diameter and the minor axis diameter) that is the closest to a circle among ellipses approximated for the respective reference points.

When the number of search lines that pass through bright spot areas is smaller than or equal to a predetermined number, the pupil-diameter estimator 28 can accurately estimate the pupil diameter, based on the contour points of the pupil which are detected on the search lines that do not pass through the bright spot areas. In this case, the contour-point detector 27 may or may not detect contour points of the pupil with respect to a search line that passes through the bright spot area. The aforementioned predetermined number is set to, for example, 10 to 20% of the total number of search lines that are set.

This pupil detecting device may be used not only in a digital signage system but also in a vehicle driving assistance system, an input aiding system for a computer, or the like. Depending on the application, the pupil detecting device may detect only the line-of-sight direction of a user and may or may not detect the gaze position of the user.

A computer program that realizes the functions of the processor in the above-described pupil detecting device may be provided in the form of a program recorded on a computer-readable recording medium, such as a magnetic recording medium or an optical recording medium. This recording medium does not include carrier waves.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium storing a computer program for pupil detection which causes a computer to execute a process, the process comprising:
   detecting, from an image of an eye of a user, an eye area in which the eye is captured;
   detecting one or more bright spot areas having brightness values larger than or equal to a threshold value in the eye area;
   setting a reference point that is assumed to be located in a pupil in the eye area;
   setting a plurality of first search lines which extend linearly, continuously and radially from the reference point as a center toward a contour of the eye area;
   determining whether or not each of the first search lines passes through the one or more bright spot areas;
   determining, with respect to a second search line that is included in the plurality of first search lines and that passes through one of the one or more bright spot areas, a degree of overlapping between the one of the bright spot areas and the pupil in accordance with brightness on a circumference of the one of the bright spot areas;
   setting a search range for a point, on a contour of the pupil n accordance with the degree of overlapping; detecting, in the search range, a first point on the contour of the pupil;
   detecting, with respect to a third search line that is included in the plurality of first search lines and that does not pass through the one or more bright spot areas, a second point on the contour of the pupil on the third search line; and
   detecting the pupil, based on the first point and the second point.

2. The non-transitory computer-readable recording medium according to claim 1, further comprising:
   calculating a brightness threshold corresponding to the contour of the pupil, based on a change in a brightness value along the third search line; and
   determining the degree of overlapping in accordance with comparison between a brightness value of each pixel along the circumference of the one of the bright spot areas and the brightness threshold.

3. The non-transitory computer-readable recording medium according to claim 2, wherein, when the brightness value of each pixel along the circumference of the one of the bright spot areas is smaller than the brightness threshold, a range that is located in the second search line and that is other than a portion that overlaps the one of the bright spot areas is set as the search range.

4. The non-transitory computer-readable recording medium according to claim 2, wherein, when the brightness value of each pixel along the circumference of one of the bright spot areas is larger than or equal to the brightness threshold, a range along the second search line from the reference point to an intersection between the second search line and the one of the bright spot areas is set as the search range.

5. The nor-transitory computer-readable recording medium according to claim 2, wherein, when the brightness value of one of pixels along the circumference of the one of the bright spot areas is smaller than the brightness threshold, and the brightness value of other pixel of the pixels along the circumference is larger than or equal to the brightness threshold, the circumference of the one of the bright spot areas is set as the search range.

6. The non-transitory computer-readable recording medium according to claim 5, wherein the pixel that is located immediately before a pixel whose brightness value becomes larger than or equal to the brightness threshold along the circumference of the one of the bright spot areas in order starting from a intersections which is included in two intersections between the circumference of the one of the bright spot area corresponding to the search range and the second search line and is closer to the reference point is detected as the point on the contour of the pupil.

7. An information processing apparatus, comprising:
a memory; and
a processor coupled to the memory and configured to perform operations of:
  detecting, from an image of an eye of a user, an eye area in which the eye is captured;
  detecting one or more bright spot areas having brightness values larger than or equal to a threshold value in the eye area;
  setting a reference point that is assumed to be located in a pupil in the eye area;
  setting a plurality of first search lines which extend linearly, continuously and radially from the reference point as a center toward a contour of the eye area;
  determining whether or not each of the first search lines passes through the one or more bright spot areas;
  determining, with respect to a second search line that is included in the plurality of first search lines and that passes through one of the one or more bright spot areas, a degree of overlapping between the one of the bright spot areas and the pupil in accordance with brightness on a circumference of the one of the bright spot areas;
  setting a search range for a point on a contour of the pupil in accordance with the degree of overlapping;
  detecting, in the search range, a first point on the contour of the pupil;
  detecting, with respect to a third search line that is included in the plurality of first search lines and that does not pass through the one or more bright spot areas, a second point on the contour of the pupil on the third search line; and
  detecting the pupil, based on the first point and the second point.

8. The information processing apparatus according to claim 7, wherein the processor:
  calculates a brightness threshold corresponding to the contour of the pupil, based on a change in a brightness value along the third search line; and
  determines the degree of overlapping in accordance with comparison between a brightness value of each pixel along the circumference of the one of the bright spot areas and the brightness threshold.

9. The information processing apparatus according to claim 8, wherein, when the brightness value of each pixel along the circumference of the one of the bright spot areas is smaller than the brightness threshold, a range that is located in the second search line and that is other than a portion that overlaps the one of the bright spot areas is set as the search range.

10. The information processing apparatus according to claim 8, wherein, when the brightness value of each pixel along the circumference of one of the bright spot areas is larger than or equal to the brightness threshold, a range along the second search line from the reference point to an intersection between the second search line and the one of the bright spot areas is set as the search range.

11. The information processing apparatus according to claim 8, wherein, when the brightness value of one of pixels along the circumference of the one of the bright spot areas is smaller than the brightness threshold, and the brightness value of other pixel of the pixels along the circumference is larger than or equal to the brightness threshold, the circumference of the one of the bright spot areas is set as the search range.

12. The information processing apparatus according to claim 11, wherein the pixel that is located immediately before a pixel whose brightness value becomes larger than or equal to the brightness threshold along the circumference of the one of the bright spot areas in order starting from a intersections which is included in two intersections between the circumference of the one of the bright spot area corresponding to the search range and the second search line and is closer to the reference point is detected as the point on the contour of the pupil.

13. A pupil detecting method, comprising:
  detecting, by a computer, from an image of an eye of a user, an eye area in which the eye is captured;
  detecting one or more bright spot areas having brightness values larger than or equal to a threshold value in the eye area;
  setting a reference point that is assumed to be located in a pupil in the eye area;
  setting a plurality of first search fines which extend linearly, continuously and radially from the reference point as a center toward a contour of the eye area;
  determining whether or not each of the first search lines passes through the one or more bright spot areas;
  determining, with respect to a second search line that is included in the plurality of first search lines and that passes through one of the one or more bright spot areas, a degree of overlapping between the one of the bright spot areas and the pupil in accordance with brightness on a circumference of the one of the bright spot areas;
  setting a search range for a point on a contour of the pupil in accordance with the degree of overlapping;
  detecting, in the search range, a first point on the contour of the pupil;
  detecting, with respect to a third search line that is included in the plurality of first search lines and that does not pass through the one or more bright spot areas, a second point on the contour of the pupil on the third search line; and
  detecting the pupil, based on the first point and the second point.

14. The pupil detecting method according to claim 13, further comprising:
  calculating a brightness threshold corresponding to the contour of the pupil, based on a change in a brightness value along the third search line; and
  determining the degree of overlapping in accordance with comparison between a brightness value of each pixel along the circumference of the one of the bright spot areas and the brightness thresholds.

15. The pupil detecting method according to claim 14, wherein, when the brightness value of each pixel along the circumference of the one of the bright spot areas is smaller than the brightness threshold, a range that is located in the second search line and that is other than a portion that overlaps the one of the bright spot areas is set as the search range.

16. The pupil detecting method according to claim 14, wherein, when the brightness value of each pixel along the circumference of one of the bright spot areas is larger than or equal to the brightness threshold, a range along the second search line from the reference point to an intersection between the second search line and the one of the bright spot areas is set as the search range.

17. According to claim 14, wherein, when the brightness value of one of pixels along the circumference of the one of the bright spot areas is smaller than, the brightness threshold, and the brightness value of other pixel of the pixels along the circumference is larger than or equal to the brightness threshold, the circumference of the one of the bright spot areas is set as the search range.

18. The pupil detecting method according to claim 17, wherein the pixel that is located immediately before a pixel whose brightness value becomes larger than or equal to the brightness threshold along the circumference of the one of the bright spot areas in order starting from a intersections which is included in two intersections between the circumference of the one of the bright spot area corresponding to the search range and the second search line and is closer to the reference point is detected as the point on the contour of the pupil.

* * * * *